(12) United States Patent
Florent et al.

(10) Patent No.: US 6,221,284 B1
(45) Date of Patent: Apr. 24, 2001

(54) ORGANIC PHOTOCHROMIC MATERIALS

(75) Inventors: Frederic H. Florent, Samoreau; David Henry, St. Michel S/Orge; Xavier LaFosse, Antony, all of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/051,025

(22) PCT Filed: Nov. 21, 1996

(86) PCT No.: PCT/US96/18668

§ 371 Date: Nov. 12, 1999

§ 102(e) Date: Nov. 12, 1999

(87) PCT Pub. No.: WO97/21122

PCT Pub. Date: Jun. 12, 1997

Related U.S. Application Data
(60) Provisional application No. 60/011,429, filed on Feb. 8, 1996, and provisional application No. 60/023,330, filed on Jul. 31, 1996.

(30) Foreign Application Priority Data

Dec. 5, 1995 (FR) .................................................. 95 14343

(51) Int. Cl.$^7$ .............................. G02B 5/23; G02C 7/10; C08K 5/35
(52) U.S. Cl. ........................... 252/586; 351/163; 524/95; 524/104; 524/110
(58) Field of Search ........................... 252/586; 523/135; 524/95, 104, 110; 351/163

(56) References Cited

U.S. PATENT DOCUMENTS

| | | | |
|---|---|---|---|
| 4,306,780 | 12/1981 | Tarumi et al. | 351/159 |
| 5,349,035 | 9/1994 | Brand et al. | 526/284 |
| 5,395,566 | * 3/1995 | Kobayakawa et al. | 252/586 |
| 5,621,017 | * 4/1997 | Kobabyakawa et al. | 252/586 |
| 5,708,064 | * 1/1998 | Coleman et al. | 252/586 |
| 5,776,376 | * 7/1998 | Nagoh et al. | 252/586 |

(List continued on next page.)

FOREIGN PATENT DOCUMENTS

| | | | |
|---|---|---|---|
| 40 10 783A1 | 10/1991 | (DE) | C08F/220/30 |
| 0 142 921A1 | 5/1985 | (EP) | C08F/220/20 |
| WO 92/05209 | 4/1992 | (WO) | C08F/220/30 |
| WO 95/10790 | 4/1995 | (WO) | . |
| WO 96/18926 | 6/1996 | (WO) | G02C/7/02 |
| WO 96/19741 | 6/1996 | (WO) | G02B/5/23 |

*Primary Examiner*—Philip Tucker
(74) *Attorney, Agent, or Firm*—Angela N. Nwaneri; Peter Rogalskyj

(57) ABSTRACT

The invention relates to transparent, photochromic or non-photochromic organic materials, which have a refractive index higher than 1.55 and which are free of optical distortions, consisting of a copolymer of:

(a) 50–90 wt. % of at least one monomer represented by the formula,

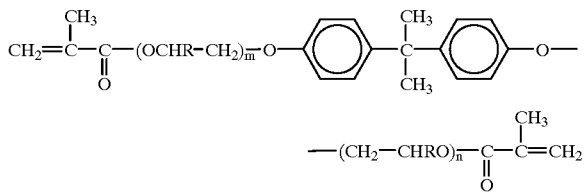

in which $R=H$ or $CH_3$, and m and n are independently 1 or 2;

(b) 10–30 wt. % of at least one aromatic monovinyl monomer represented by formula,

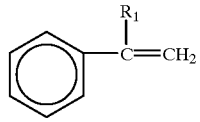

$R_1=H$ or $CH_3$; and (c) 1–20 wt. % of at least one (meth)acrylic monomer represented by formula,

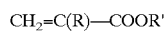

$CH_2=C(R)—COOR'$ in which $R=H$ or $CH_3$ R' is a straight-chain or branched $C_4$ to $C_{16}$ alkyl radical, an alkylaryl radical, or a polyoxyethoxylated group with formula $—(CH_2—CH_2O)_nR''$ in which n=1 to 10 and $R''=CH_3$ or $C_2H_5$. Optionally, the photochromic material may contain up to 10 wt. % of at least one photochromic coloring agent to impart desired photochromic properties.

The material which may also contain up to 15 wt. % of an aromatic divinyl monomer represented by the formula

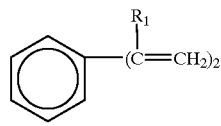

where $R_1=H$ or $CH_3$., may be polymerized in the presence of up to 0.5 wt. % of at least one non-peroxide radical polymerization initiator.

The organic material is particularly useful for the production of ophthalmic lenses and glazings for such objects as vehicles and buildings

31 Claims, No Drawings

U.S. PATENT DOCUMENTS 5,811,503 * 9/1998 Herold et al. .......................... 252/586
5,879,591 * 3/1999 Nagoh et al. .......................... 252/586
5,973,039 * 10/1999 Florent et al. ........................ 524/100
5,973,093 * 10/1999 Daughenbaugh et al. ............ 252/586
5,981,634 * 11/1999 Smith et al. .......................... 252/586
6,034,193 * 3/2000 Henry et al. .......................... 252/586

* cited by examiner

ORGANIC PHOTOCHROMIC MATERIALS

The present application is 371 of PCT/US96/18668, filed Nov. 21, 1996, which claims the benefit of U.S. Provisional patent application Ser. No. 60/011,429, filed Feb. 8, 1996; U.S. Provisional patent application Ser. No. 60/023,330, filed Jul. 31, 1996; and of French Patent Application No. 95 14343, filed Dec. 5, 1995.

BACKGROUND OF THE INVENTION

The invention relates to new transparent, photochromic and non-photochromic organic materials, which have a high refractive index with no optical distortion in the mass, to a process for their preparation, and to articles formed from these materials.

The production of a photochromic ophthalmic lens made of plastic material is very difficult. Ideally, the polymer matrix of such a lens should be thermally crosslinked, should be free of optical distortion in the mass, and should

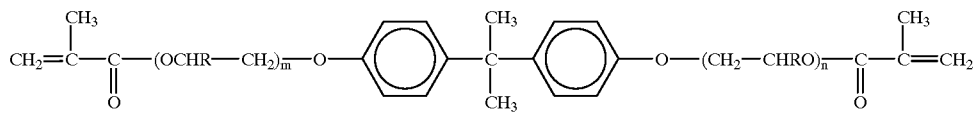

be capable of receiving and of being crosslinked in the presence of appropriate mixtures of photochromic coloring agents, such as spiroxazines and chromenes, in order to obtain a material with a high initial transmission before exposure and an extensive darkening capacity after exposure, all this with rapid darkening and lightening kinetics. Moreover, the material should have a low thermal dependence, a high fatigue strength, and a high refractive index.

Several materials have been suggested for making such materials. For example, WO-A-92/05209 describes a copolymer, which is free of optical distortions, which is suitable for manufacturing glasses for eyeglasses, which is obtained by radical polymerization of a first monomer having the following formula:

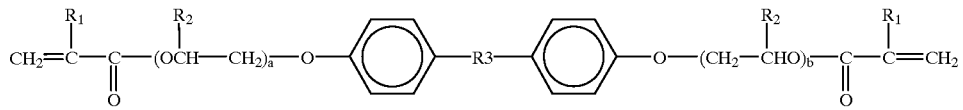

in which a and b are whole numbers from 0 to 4, $R_1$ and $R_2$=H or $CH_3$, and $R_3$=—O—, —S—, —CO—, —$SO_2$—, —$CH_2$—, —CH=CH— or $CH_3$—C—$CH_3$, with a second monomer which can be styrene or a styrene derivative, and optionally, a third monomer which can be an aromatic vinyl compound or an aromatic methacrylate, in the presence of an initiator of the peroxide type and a chain transfer agent chosen from various brominated compounds. While the copolymer of the above reference may provide a polymer matrix for a photochromic article, such as a lens, attempts to incorporate photochromic coloring agents in the copolymerizable composition failed because the coloring agents tend to be destroyed by the peroxide initiator. And even if the peroxide initiator is replaced by a gentler radical polymerization initiator, such as a diazoic compound such as azo-bis-isobutyronitrile, the material which is obtained is still unsatisfactory because the photochromic coloring agents are inhibited by the brominated chain transfer agent which is used, as the present inventors were able to observe.

One method which has been suggested for overcoming the above problems is to incorporate the coloring agents in the matrix after polymerization, for example, by a thermal diffusion process. However, such a process tends to be inefficient, adds to the manufacturing cost of the material and complicates its process of manufacturing.

In order to remedy the above problems, co-pending, co-assigned French Patent Application No. 95 08424, filed Jul. 12, 1995, for "New photochromic organic materials," (herein incorporated by reference), discloses a new transparent photochromic organic materials having a refractive index greater than 1.55 and free of optical distortions, obtained by radical polymerization of a polymerizable composition containing:

a) 80 to 95 wt % of at least one monomer represented by general formula (I):

in which R=H or $CH_3$, and m and n are independently 1 or 2;

b) 5 to 20 wt % of at least one aromatic monovinyl monomer represented by general formula (II):

where $R_1$=H or $CH_3$

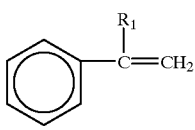

c) optionally, up to 10 wt % of an aromatic divinyl monomer represented by the general formula (III):

where $R_1$=H or $CH_3$.

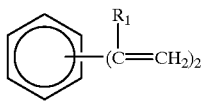

d) an effective quantity of at least one coloring agent giving the material photochromic properties, chosen from the group of the spiroxazines, spiropyrans and chromenes;

e) an effective quantity of a chain transfer agent; and f) an effective quantity of a radical polymerization initiator; characterized by the fact that the chain transfer agent is a straight-chain alkanethiol, and the radical polymerization initiator is a diazoic compound, as well as a process for preparation of these photochromic materials and photochromic articles consisting of these materials.

Although the photochromic materials described in the aforementioned French patent application represent a significant advance, there continues to be a need for organic materials which are easier and therefore less costly to form into lenses free of optical defects

SUMMARY OF THE INVENTION

Briefly, the invention relates to new transparent organic photochromic and non-photochromic materials which have a refractive index higher than 1.55 and which are free of optical distortions. In particular, the invention relates to an organic material consisting essentially of a copolymer of:

a) 50 to 90 and preferably 55 to 70 wt % of units derived from at least one monomer represented by general formula (I):

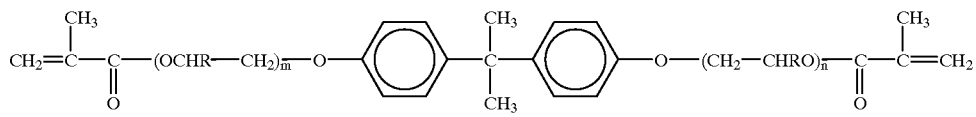

in which R=H or CH$_3$, and m and n are independently 1 or 2;

b) 10 to 30 and preferably 15 to 25 wt % of units derived from at least one aromatic monovinyl monomer represented by general formula (II):
where R$_1$=H or CH$_3$;

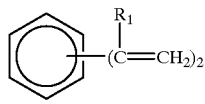

c) up to 15 wt. %, preferably 2 to 6 wt. % of units derived from an aromatic divinyl monomer represented by general formula (III):
where R$_1$=H or CH$_3$;

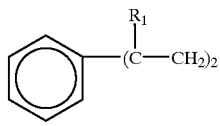

d) 1 to 20 and preferably 5 to 15 wt % of units derived from at least one (meth)acrylic monomer corresponding to the general formula (IV):

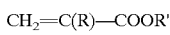

in which R=H or CH$_3$,
R' is a straight-chain or branched C$_4$ to C$_{16}$ alkyl radical, an alkylaryl radical, or a polyoxyethoxylated group with formula —(CH$_2$—CH$_2$O)$_n$R" in which n=1 to 10 and R"=CH$_3$ or C$_2$H$_5$, and e) optionally, an effective quantity of at least one coloring agent giving desired photochromic properties, chosen from the group of the spiroxazines, spiropyrans and chromenes.

In another aspect, the invention relates to an organic photochromic and non-photochromic material which further includes at least one non-photochromic coloring agent.

In still another aspect, the invention relates to a process for the preparation of new transparent, organic materials, which have a refractive index greater than 1.55 and which are free of optical distortions, the process consisting of the radical polymerization of a polymerizable composition comprising: (a) the monomers of formulae I, II, III and IV as defined above; (b) optionally, an effective quantity of at least one coloring agent giving the desired photochromic properties, chosen from the group of the spiroxazines, spiropyrans and chromenes; (c) optionally, an effective quantity of at least one chain transfer agent chosen from a group consisting of the straight-chain alkanethiols, the alkanethiols substituted by at least one aryl or a radical, and the thiophenols; (d) an effective quantity of at least one radical polymerization initiator, and (e) optionally, a hindered amine light stabilizer.

In a further aspect, the invention relates to a method of making aa transparent organic material having a base tint by first forming a transparent organic material by the radical polymerization of components (a) through (e) as above, and subsequently applying a non-photochromic dye to the photochromic material. In yet another aspect, the non-photochromic dye is combined with the polymerizable matrix so that the resulting photochromic material combines both photochromic and non-photochromic dyes.

For the purposes of the present invention, the term "(meth)acrylic" means acrylic or methacrylic; and for ease of discussion, "organic material" means either photochromic or non-photochromic transparent organic materials.

DETAILED DESCRIPTION OF THE INVENTION

The organic material of the invention is characterized by having a refractive index greater than 1.55, and which is prepared by the radical polymerization of a plastic matrix. In the preferred embodiment, the coloring agent is incorporated in the polymerizable composition to obtain directly, after polymerization, and optionally, an organic material having desired properties. As a variant, it is also possible to produce the organic material by first preparing a nonphotochromic material by polymerization as described herein, and subsequently imparting photochromic properties, for example, by diffusion of a photochromic coloring agent, as is well known in the art.

The polymerizable organic matrix of the invention is composed of (a) monomers selected from formulae I, II, III, and IV as defined above, (b) optionally, a photochromic coloring agent or dye, (c) optionally, a chain transfer agent (CTA), (d) a radical polymerization initiator or catalyst, and (e) optionally, a hindered amine light stabilizer (HALS). The various components of the inventive matrix is further described below.

Monomers of formula I are well known and are commercially available. One particularly preferred monomer of this class is Diacryl 121, which is available from Akzo Nobel, N.V., Nethedands, in which R=H and m and n=2. When this monomer is present in an amount below 50 wt. %, the matrix tends to exhibit excessive shrinkage during polymerization, leading to pre-mold release, which in turn leads to material having poor optical quality. Above 90 wt. %, the resulting material also tends to exhibit poor optical quality.

Examples of monomers of formula II include, styrene and methylstyrene. Because styrene has a rather high refractive index (1.595), it has the beneficial effect of increasing the refractive index of the organic material. When styrene is present in an amount below 10 wt. %, the material tends to be of poor optical quality (i.e., birefringence due to mechanical stress), low strength, and low refractive index Above 30 wt. %, the matrix tends to stick to the mold during polymerization, and a decrease in the kinetics of the resulting photochromic material is observed. By reduced kinetics in photochromic properties we mean that there is observed, slow darkening when the photochromic material is exposed a light source, and when the light source is eliminated, the rate of lightening is also slow. In general, the faster the kinetics, the higher the thermal dependence. We have also observed that materials having excessively high thermal dependence have a tendency not to darken sufficiently when exposed to light. Therefore, there is a need to find an optimal amount of styrene and other monomers in order to have a proper balance of fast response and level of darkness achieved. Styrene is the preferred monomer of this class of monomers.

Monomers of formula III are represented by divinylbenzene and di(methylvinyl)benzene. Divinyl benzene (DVB) is the preferred monomer of this class. We have found that when this monomer is absent, the resulting photochromic material tends to exhibit slow kinetics, and the level of darkening when the material is exposed to light is less than optimal. When this monomer is present in amounts in excess of 15 wt. %, excessive shrinkage is observed, leading to pre-mold release and optical defects. In addition, at amounts over 15 wt. %, the glass transition temperature ($T_g$) increases, but the mechanical strength decreases. We have found that kinetic properties, darkening level, molding, $T_g$ and strength are all optimized when this monomer is present in an amount in the range of 2–4 wt. %. As is the case with styrene, the preferred monomer, DN9B has a refractive index of 1.61, and therefore, it has the additional beneficial effect of increasing the refractive index of the photochromic material.

We have found that there is an optimal range of the ratio of the monomer of formula III to the monomer of formula II. In particular, we have found that when the monomer of formula II is styrene, and the monomer of formula III is DVB, then preferably, the ratio of DVB:STYRENE is no greater than 1.5, more preferably, it is in the range of 0.004–0.4, and most preferably in the range of 0.08–0.24. For ease of discussion we will refer to this ratio of DVB:STYRENE as R We have found that provided the sum of DVB+STYRENE remains constant, the higher the value of K, the faster the kinetics (darkening and lightening or fading), and the lower the impact strength. Also, the higher the value of R, the darker the photochromic material when exposed to light. Finally, we have also observed a slight increase in refractive index for a matrix which did not contain the monomer of formula IV. As the value of R reduces, the reverse of the above observations is true.

The monomers of formula IV, the (meth)acrylic monomers, are also well-known products which are commercially available. Examples include, the butyl, pentyl, hexyl, heptyl, octyl, and 2-ethylhexyl (meth)acrylates (EHMA), as well as ethyltriglycol (meth)acrylate. The preferred monomer of this class is EHMA Below 1 wt. % the resulting material exhibits low $T_g$, making the material difficult to finish (grinding, polishing and edging). Therefore, it is desirable to have this monomer is sufficient amount to overcome the above difficulty. However, because EHMA has a low refractive index (1.5), it also has the disadvantage of lowering the refractive index of the photochromic material Thus, at EHMA value at the lower limit of 1 wt. %, the refractive index of the resulting material is 1.575. However, at amounts in excess of 20 wt. %, the refractive index of the resulting photochromic material drops to below 1.55. Generally, we have found that the optical quality of the photochromic composition, the $T_g$, and the finishing properties are optimized when this monomer is present in an amount in the range of 5–15 wt. %.

Thus, for the inventive organic material, by an appropriate choice and amounts of monomers it is possible to adjust the optical properties of the final material. For example, for photochromic materials, kinetic properties such as speed of darkening, speed of lightening, etc. may be adjusted as needed. In particular, by the addition of a monomer of formula II such as styrene to the dimethacrylic compound of formula I, it is possible to slow the kinetics of the coloring agents which otherwise would be intrinsically too fast in the methacrylic matrix. Conversely, the incorporation of a third monomer selected from the monomers of formula III such as divinylbenzene, results in an increase in the speed or kinetics of a coloring agent which would otherwise be too slow in the methyacrylic matrix. Thus, by a wise choice of the weight ratio of the monomer of formula II/monomer of formula III in a dimethacrylic matrix as described above, it is possible to adjust the kinetic parameters of the photochromic process to a desired value, without altering the optical quality of the resulting materials, and while maintaining a high refractive index. The incorporation of the fourth monomer of formula IV in the proportions defined allows one to obtain more readily, thick lenses which are free of optical defects (distortions, stresses, cords, etc.) without altering properties such as the glass transition temperature $T_g$, the impact strength, or the refractive index.

The photochromic coloring agent can be chosen from the general classes of the spiroxazines, spiropyrans and chromenes which have photochromic properties. Quite a few photochromic coloring agents of this type are described in the literature and are available commercially. Useful spiroxazines are described in co-pending, co-assigned French patent application by Chan, titled "Photochromic Spiroxazines, Compositions and Articles," herein incorporated by reference. Spiroxazine coloring agents which can be used are described particularly in U.S. Pat. Nos. 3,562,172, 4,634,767, 4,637,698, 4,720,547, 4,756,973, 4,785,097, 4,792,224, 4,816,584, 4,831,142, 4,909,963, 4,931,219, 4,936,995, 4,986,934, 5,114,621, 5,139,707, 5,233,038, 4,215,010, 4,342,668, 4,699,473, 4,851,530, 4,913,544, 5,171,636, 5,180,524, 5,166,345 and in EP-A 0,508,219, 0,232,295, and 0,171,909, among others. Chromenes which can be used are described in U.S. Pat. Nos. 567,605, 4,889,413, 4,931,221, 5,200,116, 5,066,818, 5,244,602, 5,238,981, 5,106,998, 4,980,089, 5,130,058 and EP-A-0, 562,915, among others. Furthermore, spiropyrans which can be used are generally described in "Photochromism," G. Brown, Editor—Techniques of Chemistry—Wiley Interscience—Vol. III—1971—Chapter III—Pages 45–294—R. C. Bertelson; and "Photochromism: Molecules & Systems," Edited by H. Dürr—H. Bouas-Laurent—Elsevier 1990—Chapter 8: Spiropyrans—Pages 314–455—R. Guglielmetti. The teachings of all these patents and documents are incorporated here by reference.

On an indicative and nonlimiting basis, when one wishes to produce a photochromic organic material, the proportion of photochromic coloring agent(s) to be incorporated in the polymerizable composition can range from 0.01 to 10.0 wt %, preferably from 0.01 to 5 wt %, and more preferably, from 0.05 to 1.0 wt. % with respect to the weight of the monomers.

Various combinations of coloring agents may be used in order to obtain a desired color or tint. For example, it is possible to use a combination of photochromic coloring agents giving a gray or brown tint in the darkened state. In one particularly useful embodiment, the photochromic dye consisted of a mixture of coloring agents comprising two spiroxazines and two chromenes. We have found the following specific coloring agents to be particularly useful for the invention:

| Dye | Manufacturer | Chemical type |
| --- | --- | --- |
| Blue D | (Great Lakes) | Spiroxazine |
| Red PNO | (Great Lakes) | Spiroxazine |
| Yellow L | (Great Lakes) | Chromene |
| Sea Green | (James Robinson Ltd.) | Spiroxazine |
| Berry Red | (James Robinson Ltd.) | Chromene |

The chain transfer agent (CTA), can be incorporated in the polymerizable composition in a proportion of up to 5 wt. %, preferably, 0.01 to 2 wt. %, and more preferably in an amount in the range of 0.01 to 1.0 wt. % with respect to the monomers. For thin organic materials such as thin lenses measuring 2.0 mm in thickness or less, it may not be necessary to incorporate a CTA in the matrix However, for lenses greater than 2.0 mm in thickness, a CTA may be required in an amount within the stated ranges. At amounts greater than 5 wt. % the $T_g$ drops and the lens becomes so soft as to make it difficult to finish the lens. We have found that at an amount of about 0.9 wt. % a rather wide range of lens thicknesses (1.5–20 mm) can be manufactured. Preferably, the selected CTA is a non-halogenated chain transfer agent because we have found that halogenated CTAs tend to destroy the dye during polymerzation, and for some dyes, halogenated CTAs may also lead to a gradual discoloration of the lens with use.

The chain transfer agent can be chosen from among, straight-chain $C_2$ to $C_{18}$, alkanethiols, alkanethiols substituted by at least one aryl or alkyl radical, and thiophenols. Straight-chain $C_4$ to $C_{16}$ alkanethiols are preferred because they offer less volatility than the $C_2$ or $C_3$ homologues. Specific examples are butanethiol, pentanethiol hexanethiol, heptanethiol, octanethiol, decanethiol, dodecanethiol, and tetradecanethiol. Another class of products which are useful as CTAs for the invention include bis-merecaptoethyl ether (MEE), having the general formula $HS—CH_2CH_2—O—CH_2CH_2—SH$. The preferred CTA for the invention is dodecanethiol.

We have found that for photochromic materials, the higher the amount of CTA, the faster and the darker the resulting photochromic material. Also, as the level of CTA increases, the $T_g$ decreases, strength (impact resistance stress) increases, refractive index decreases, and optical quality (stress and striae) improves. As the level of CTA decreases, the converse is true. For non-photochromic materials it is not necessary to incorporate a CTA in the organic composition. If a CTA is to be used, non-halogenated CTAs are preferred as halogenated CTAs may lead to discoloration.

For the photochromic material, any catalyst which will not react with the coloring agent or dyes may be used. We have found that non-peroxide initiators are particularly suited to the present photochronic material, preferably, initiators of the diazo type. These compounds are well-known and available commercially. Examples of specific diazoic initiators are azobisisobutyronitrile (AIBN) and 2,2'-azobis (2-methylbutyronitrile) (AMBN), among others. The catalyst may be present in amounts in the range of 0.01 to 1.0 wt. %, preferably, 0.05 to 0.5 wt. % based on the monomers. At catalyst levels below about 0.05 wt. %, it becomes necessary to increase the temperature significantly in order to initiate the polymerization reaction Excessive temperature lead to "run-away", making the process difficult to control. At catalyst levels above 0.5 wt. %, excess amount of free radicals may be generated, and these free radicals may destroy the dyes and lead to fatigue in the resulting photochromic material. In addition, when the amount of initiator is over 0.5 wt. %, the reaction may proceed so fast that it may be difficult to control.

We have found that peroxide initiators such as the tert-butyl, isobutyryl, lauryl, benzoyl, and substituted benzoyl peroxides tend to interact with the coloring agent and are therefore not useful for the present invention. Other examples of useful radical polymerization initiators can be found in "Polymer Handbook," J. Brandrup and E. H. Immergut—Wiley Intersciences, Part II, pages 20 to 42. Therefore, when a photochromic coloring agent is incorporated in the polymerizable composition for directly producing an organic material with photochromic properties by copolymerization, it is appropriate to use a diazoic initiator and to exclude the presence of any peroxide initiator in order to prevent degradation of the photochromic coloring agent during copolymerization, as disclosed in the aforementioned French patent application.

The joint use of an alkanethiol as the chain transfer agent, and a diazoic compound as the initiator allows one to prepare a photochromic material with excellent properties by radical polymerization in the presence of at least one photochromic coloring agent. In particular, we have found that the preferred chain transfer agents, the straight chain alkanethiols, have a chain transfer coefficient of zero with our preferred catalysts, the diazo compounds. Of course, for non-photochromic materials, peroxide initiators may be used in addition to the diazo initiators.

We have found that the use of HALS in the present invention provides useful stabilizing effect to the matrix. In the absence of HALS, the resulting photochromic material tends to discolor with use. That is, in the clear state, the photochromic material exhibits an unintended tint. In one experiment, a blue discoloration was observed. In amounts greater than 2 wt. %, the HALS tends to hinder polymerization.

The invention also relates to articles consisting wholly or in part of an organic materials according to the invention. Nonlimiting examples of such articles are ophthalmic corrective lenses, sunglasses, glazings (e.g., windows) for vehicles or buildings etc. In these articles, the organic material of the invention can constitute the whole thickness of the article (mass article) or can be in the form of a film or stratified layer applied on a transparent organic or mineral support.

Ophthalmic lenses are the preferred articles and can be conveniently produced by polymerization in lens molds, for example, as described in U.S. Pat. No. 2,242,386, U.S. Pat. No. 3,136,000 or U.S. Pat. No. 3,881,683.

For a better understanding of the invention, the following nonlimiting examples are given. All the indicated proportions are parts by weight. In all the examples, the polymerization of the polymerizable composition was carried out in a lens mold under the following conditions: the polymerizable composition is heated to 55° C. so as to bring about the thermal degradation of the diazoic compound with release of free radicals; this temperature is maintained for 16 hours; the temperature is then raised to 90° C., and this temperature is maintained for 2 hours. Then, the lens obtained is removed from the mold and annealed at 120° C. for 1 hours. The raw materials used in the examples are listed below:
Monomers:

Diacryl 121 of Akzo Chemical (DIA)

Styrene (STY)

Divinylbenzene (DVB)

2-ethylhexyl methacrylate (AEH)

Butyl methacrylate (MAB)

Ethyltriglycol methacrylate (MAET)
Catalysts (radical polymerization initiator):

2-2' Azobis 2-methylbutyronitrile (AMBN)
Chain transfer agent (CTA):

1-dodecanethiol (DDT)
Photochromic coloring agent:

Red PNO, a spiroxazine marketed by the company Great Lakes.

EXAMPLES 1 TO 9

Eight compositions according to the invention were prepared, and they were polymerized into plane lenses 2 mm thick (Examples 1–3, 7 and 8) or into corrective lenses with −4 diopters with a thickness in the center of 1.5 mm (Examples 4–6) by the general polymerization process described above. Table I which follows summarizes the formulations of these polymerizable compositions in wt. %.

visible stress in polarized light or defects (cords, convection lines) were visible by shadowgraphic method.

In the lenses of Examples 1, 2, 3, and 9 the optical transmission at 560 nm was measured before and after exposure for 15 min under a xenon lamp (40,000 lx), with the following results:

| Lens of Example | Transmission Before Exposure (%) | Transmission After Exposure (%) |
| --- | --- | --- |
| 1 | 88.2 | 14.5 |
| 2 | 87.7 | 14.2 |
| 3 | 88.1 | 11.9 |
| 9 | 87.5 | 30.0 |

These lenses have good photochromic properties.

The lenses of Examples 4, 5, and 6 were subjected to the drop ball test defined in "Use of Impact Resistant Lenses in Eyeglasses and Sunglasses," Code of Federal Regulation 21CFR 801-410 Washington D.C., Apr. 1, 1990. All the lenses pass the test successfully.

Measurements of the refractive index $n_{d20}$, of the Abbe number $v_d$, and of the glass transition temperature $T_g$ were made on the lenses prepared in Examples 1 to 8, with the following results:

| Lens of Example | $n_{d20}$ | vd | Tg, ° C. |
| --- | --- | --- | --- |
| 1 | 1.5581 | 36.9 | 118 |
| 2 | 1.5581 | 36.7 | 121 |
| 3 | 1.5599 | 36.7 | 113 |
| 4 | 1.5595 | 36.3 | 124 |
| 5 | 1.5588 | 37.0 | 112 |
| 6 | 1.5586 | 36.8 | 121 |
| 7 | 1.5606 | 36.4 | 110 |
| 8 | 1.5594 | 36.5 | — |
| 9 | 1.5560 | 37.6 | 112 |

The Shore hardness D of the lens of Example 7 was also measured. It was equal to 86.

As stated earlier, it is also contemplated by the present invention to provide a method of forming a photochromic organic material having a base tint by first forming a photochromic material according the present invention, and subsequently imparting a tint to the photochromic material by any known method such as by thermal diffusion (dipping or spraying). Any non-photochromic dye can be used pro-

TABLE I

| Ex | DIA | STY | DVB | MAEH | MAB | MAET | AMBN | DDT | Coloring Agent | R = DVB/STY |
| --- | --- | --- | --- | --- | --- | --- | --- | --- | --- | --- |
| 1 | 64 | 22 | 3 | 10 | — | — | 0.2 | 1 | 0.02 | 0.136 |
| 2 | 64 | 22 | 3 | — | 10 | — | 0.2 | 1 | 0.02 | 0.136 |
| 3 | 64 | 22 | 3 | — | — | 10 | 0.2 | 1 | 0.02 | 0.136 |
| 4 | 58.4 | 24.8 | 5 | — | 10.8 | — | 0.2 | 1 | — | 0.202 |
| 5 | 64.3 | 22 | 2.2 | — | — | 11 | 0.2 | 0.5 | — | 0.100 |
| 6 | 65.8 | 22.5 | 2.2 | 9 | — | — | 0.2 | 0.5 | — | 0.098 |
| 7 | 62.6 | 21.4 | 4.3 | — | — | 10.7 | 0.2 | 1 | — | 0.201 |
| 8 | 65.4 | 22.4 | 2.8 | 9 | — | — | 0.2 | 0.4 | — | 0.125 |
| *9 | 62.4 | 19.4 | 4.0 | 13.0 | — | — | 0.2 | 0.9 | .153 | 0.206 |

*This composition also contained 0.5 wt. % of a HALS.

All the lenses prepared from the compositions of Examples 1 to 9 above were of good optical quality: no vided such dye exhibits little or no interaction with the photochromic dye. The non-photochromic dye can also be incorporated into the polymerizable matrix in the same manner as the photochromic dye provided the non-photochromic dye is compatible with, and will not interact with, the photochromic dyes.

The embodiments described above are illustrative and not exhaustive. It will be clear to persons skilled in the art that the above illustrations can be modified, particularly by substitution of technical equivalents, without consequently leaving the intended scope of the invention.

What is claimed is:

1. An organic photochromic material, said material comprising a copolymer of:

(a) at least one monomer represented by general formula (I),

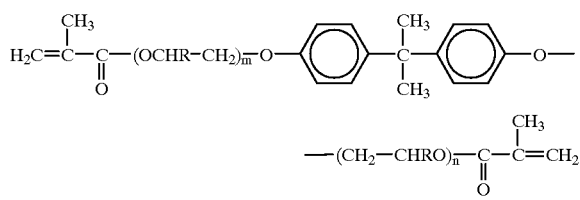

in which R=H or CH$_3$ and m and n are, independently, 1 or 2;

(b) at least one aromatic monovinyl monomer represented by formula (II),

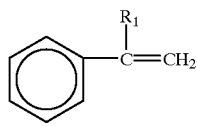

R$_1$=H or CH$_3$; and (c) at least one (meth)acrylic monomer represented by formula (IV),

CH$_2$=C(R)—COOR' in which R=H or CH$_3$ and R' is a straight or branched C$_4$ to C$_{16}$ alkyl radical, an alkylaryl radical, or a polyoxyethoxylated group with formula —(CH$_2$—CH$_2$O)$_n$R" in which n=1 to 10 and R"=CH$_3$ or C$_2$H$_5$;

(d) at least one photochromic coloring agent selected from the group consisting of spiroxazines, spiropyrans, chromenes, and combinations thereof; and (e) optionally, one or more non-photochromic coloring agents to impart a base tint to said material and/or one or more hindered amine stabilizers.

2. The organic photochromic material according to claim 1 further comprising an aromatic divinyl monomer represented by formula (III),

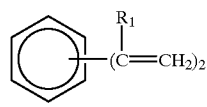

where R$_1$=H or CH$_3$.

3. The organic photochromic material according to claim 1, further comprising at least one chain transfer agent.

4. The organic photochromic material according to claim 3, wherein the chain transfer agent is a non-halogenated chain transfer agent selected from the group consisting of straight chain alkanethiols, bis-mercaptoethyl ethers, and combinations thereof.

5. The organic photochromic material according to claim 3, wherein the chain transfer agent is a straight chain alkanethiol selected from the group consisting of butanethiol, pentanethiol, hexanethiol, heptanethiol, octanethiol, decanethiol, dodecanethiol, and tetradecanethiol.

6. The organic photochromic material according to claim 3, wherein the chain transfer agent is a bis-mercaptoethyl ether having the general formula HS—CH$_2$CH$_2$—O—CH$_2$CH$_2$—SH.

7. The organic photochromic material according to claim 1 comprising of 55 to 70 wt. % of at least one monomer represented by formula (I); 10 to 30 wt. % of at least one aromatic monovinyl monomer represented by formula (II); 1 to 20 wt. % of at least one (meth)acrylic monomer represented by formula (IV); and 0.01 to 10 wt. % of at least one photochromic coloring agent; said organic photochromic material further comprising up to 15 wt. % of at least one aromatic divinyl monomer represented by formula (III),

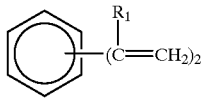

where R$_1$=H or CH$_3$; wherein the ratio of aromatic divinyl to aromatic monovinyl monomers is in the range of 0 to 1.5.

8. The organic photochromic material according to claim 7, wherein the ratio of aromatic divinyl to aromatic monovinyl monomers is in the range of 0.004 to 0.4.

9. The organic photochromic material according to claim 1, comprising of 55 to 70 wt. % of at least one monomer represented by formula (I); 15 to 25 wt. % of at least one aromatic monovinyl monomer represented by formula (II); 5 to 15 wt. % of at least one (meth)acrylic monomer represented by formula (IV); and 0.01 to 5 wt. % of at least one photochromic coloring agent; said organic photochromic material further comprising 2 to 6 wt. % of at least one aromatic divinyl monomer represented by formula (III),

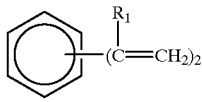

where R$_1$=H or CH$_3$; wherein the ratio of aromatic divinyl to aromatic monovinyl monomers is in the range of 0.08 to 0.24.

10. An organic photochromic material obtained by radical polymerization of a polymerizable composition comprising:

(a) at least one monomer represented by general formula (I),

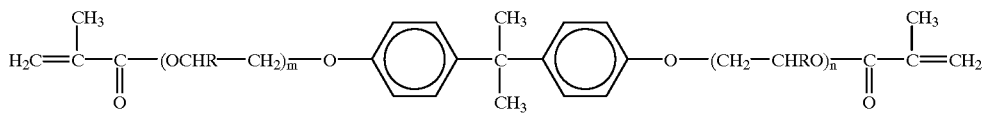

in which R=H or CH$_3$ and m and n are, independently, 1 or 2;

(b) at least one aromatic monovinyl monomer represented by formula (II),

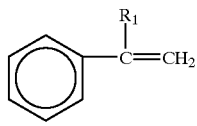

R$_1$=H or CH$_3$; and (c) at least one (meth)acrylic monomer represented by formula (IV),

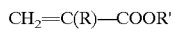

CH$_2$=C(R)—COOR' in which R=H or CH$_3$ and R' is a straight or branched C$_4$ to C$_{16}$ alkyl radical, an alkylaryl radical, or a polyoxyethoxylated group with formula —(CH$_2$—CH$_2$O)$_n$R" in which n=1 to 10 and R"=CH$_3$ or C$_2$H$_5$;

(d) at least one photochromic coloring agent selected from the group consisting of spiroxazines, spiropyrans, chromenes, and combinations thereof; and (e) a non-peroxide radical polymerization initiator.

11. The organic photochromic material according to claim 10, wherein the polymerizable composition further comprises an aromatic divinyl monomer represented by formula (III),

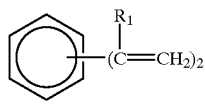

where R$_1$=H or CH$_3$.

12. The organic photochromic material according to claim 10, wherein the polymerizable composition further comprises at least one chain transfer agent.

13. The organic photochromic material according to claim 10, wherein the chain transfer agent is a non-halogenated chain transfer agent selected from the group consisting of straight chain alkanethiols, bis-mercaptoethyl ethers, and combinations thereof.

14. The organic photochromic material according to claim 10, wherein the chain transfer agent is a straight chain alkanethiol selected from the group consisting of butanethiol, pentanethiol, hexanethiol, heptanethiol, octanethiol, decanethiol, dodecanethiol, and tetradecanethiol.

15. The organic photochromic material according to claim 10, wherein the chain transfer agent is a bis-mercaptoethyl ether having the general formula HS—CH$_2$CH$_2$—O—CH$_2$CH$_2$—SH.

16. The organic photochromic material according to claim 10, wherein the polymerizable composition comprises: 55 to 70 wt. % of at least one monomer represented by formula (I); 10 to 30 wt. % of at least one aromatic monovinyl monomer represented by formula (II); 1 to 20 wt. % of at least one (meth)acrylic monomer represented by formula (IV); 0.05 to 0.5 wt. % of at least one non-peroxide radical polymerization initiator; 0.01 to 10 wt. % of at least one photochromic coloring agent; and up to 5 wt. % of a chain transfer agent selected from the group consisting of straight chain alkanethiols, bis-mercaptoethyl ethers, and combinations thereof; said organic photochromic material further comprising up to 15 wt. % of at least one aromatic divinyl monomer represented by formula (III),

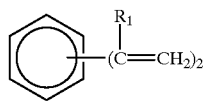

where R$_1$=H or CH$_3$.

17. The organic photochromic material according to claim 10, wherein the polymerizable composition further comprises one or more non-photochromic coloring agents to impart a base tint to said material and/or one or more hindered amine stabilizers.

18. A method of making an organic photochromic material, said method comprising radically polymerizing a polymerizable composition comprising:

(a) at least one monomer represented by general formula (I),

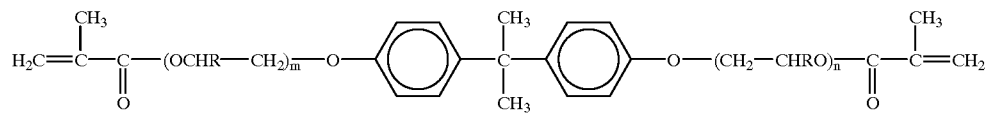

in which R=H or CH$_3$ and m and n are, independently, 1 or 2;

(b) at least one aromatic monovinyl monomer represented by formula (II),

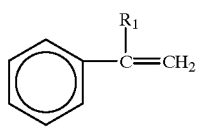

$R_1$=H or $CH_3$; and (c) at least one (meth)acrylic monomer represented by formula (IV),

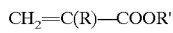

in which R=H or $CH_3$ and R' is a straight or branched $C_4$ to $C_{16}$ alkyl radical, an alkylaryl radical, or a polyoxyethoxylated group with formula —$(CH_2$—$CH_2O)_n$R" in which n=1 to 10 and R"=$CH_3$ or $C_2H_5$;

(d) at least one photochromic coloring agent selected from the group consisting of spiroxazines, spiropyrans, chromenes, and combinations thereof; and (e) a non-peroxide radical polymerization initiator.

19. The method according to claim 18, wherein the polymerizable composition further comprises an aromatic divinyl monomer represented by formula (III),

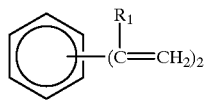

where $R_1$=H or $CH_3$.

20. The method according to claim 18, wherein the polymerizable composition further comprises at least one chain transfer agent.

21. The method according to claim 20, wherein the chain transfer agent is a non-halogenated chain transfer agent selected from the group consisting of straight chain alkanethiols, bis-mercaptoethyl ethers, and combinations thereof.

22. The method according to claim 20, wherein the chain transfer agent is a straight chain alkanethiol selected from the group consisting of butanethiol, pentanethiol, hexanethiol, heptanethiol, octanethiol, decanethiol, dodecanethiol, and tetradecanethiol.

23. The method according to claim 20, wherein the chain transfer agent is a bis-mercaptoethyl ether having the general formula HS—$CH_2CH_2$—O—$CH_2CH_2$—SH.

24. The method according to claim 18, wherein the polymerizable composition comprises: 55 to 70 wt. % of at least one monomer represented by formula (I); 10 to 30 wt. % of at least one aromatic monovinyl monomer represented by formula (II); 1 to 20 wt. % of at least one (meth)acrylic monomer represented by formula (IV); 0.05 to 0.5 wt. % of at least one non-peroxide radical polymerization initiator; 0.01 to 10 wt. % of at least one photochromic coloring agent; and up to 5 wt. % of a chain transfer agent selected from the group consisting of straight chain alkanethiols, bis-mercaptoethyl ethers, and combinations thereof; said organic polymerizable composition further comprising up to 15 wt. % of at least one aromatic divinyl monomer represented by formula (III),

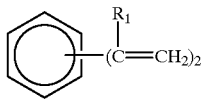

where $R_1$=H or $CH_3$.

25. The method according to claim 18, wherein the polymerizable composition further comprises one or more non-photochromic coloring agents to impart a base tint to said material and/or one or more hindered amine stabilizers.

26. An article comprising an organic photochromic material according to claim 1.

27. The article according to claim 26, wherein said article is an ophthalmic lens.

28. The article according to claim 26, wherein said article is a glazing for vehicles or buildings.

29. An article comprising an organic photochromic material according to claim 10.

30. The article according to claim 29, wherein said article is an ophthalmic lens.

31. The article according to claim 29, wherein said article is a glazing for vehicles or buildings.

* * * * *